United States Patent
Noh

[11] Patent Number: 6,134,238
[45] Date of Patent: Oct. 17, 2000

[54] LAYERED BANDWIDTH MANAGEMENT IN ATM/SDH (SONET) NETWORKS

[75] Inventor: Tai Noh, Manalapan, N.J.

[73] Assignee: Lucent Technologies Inc., Murray Hill, N.J.

[21] Appl. No.: 08/892,590

[22] Filed: Jul. 14, 1997

Related U.S. Application Data

[60] Provisional application No. 60/044,027, May 6, 1997.

[51] Int. Cl.[7] .............................. H04L 12/28; H04L 12/56
[52] U.S. Cl. ............................................ 370/395; 370/468
[58] Field of Search ..................................... 370/351, 352, 370/353, 355, 356, 357, 412, 468, 474, 395, 498, 503, 509, 464, 465

[56] References Cited

U.S. PATENT DOCUMENTS

| | | | |
|---|---|---|---|
| 5,291,481 | 3/1994 | Doshi et al. .............................. | 370/230 |
| 5,341,376 | 8/1994 | Yamashita ................................ | 370/466 |
| 5,365,521 | 11/1994 | Ohnishi et al. .......................... | 370/352 |
| 5,509,077 | 4/1996 | Moehrmann .............................. | 380/30 |
| 5,563,877 | 10/1996 | Van Tetering et al. ................. | 370/419 |
| 5,673,262 | 9/1997 | Shimizu ................................... | 370/395 |
| 5,742,606 | 4/1998 | Iladis et al. .............................. | 370/413 |
| 5,793,760 | 8/1998 | Chopping ................................. | 370/355 |
| 5,838,922 | 11/1998 | Galand et al. ...................... | 395/200.62 |
| 5,903,547 | 5/1999 | Shimokasa .............................. | 370/232 |
| 5,920,412 | 7/1999 | Chang ..................................... | 359/128 |

Primary Examiner—Ajit Patel
Assistant Examiner—Bob A. Phunkulh

[57] ABSTRACT

A layered bandwidth management system for transporting both STM and ATM traffic from customer circuit elements over a synchronous digital hierarchical (SDH (SONET)) transport network comprises a hybrid transport device for separately transporting STM and ATM traffic over separate first physical channels, the physical channels having fixed bandwidth allocations; a first bandwidth control device responsive to STM traffic contained in the first physical channel for directing STM traffic in fixed bandwidth allocations to a further destination; and, a second bandwidth control device responsive to ATM traffic contained in a separate first physical channel for switching the ATM traffic to a further destination, the second bandwidth control device capable of directing ATM traffic to the first physical channels for more efficient physical channel bandwidth utilization.

13 Claims, 6 Drawing Sheets

LAYERED BANDWIDTH MANAGEMENT IN ATM/SDH (SONET) NETWORKS

RELATED APPLICATIONS

This application claims the benefit of provisional U.S. patent application Ser. No. 60/044,027 filed May 6, 1997.

FIELD OF THE INVENTION

The instant invention relates generally to ATM (Asynchronous Transfer Mode)/SDH (Synchronous Digital Hierarchy) (SONET) networks, and particularly, a layered bandwidth management scheme capable of meeting QoS (Quality of Service) requirements in an integrated ATM and SDH (SONET) transport network from the perspective of transport network evolution toward ATM.

BACKGROUND OF THE INVENTION

The Telecommunications Management Network ("TMN") is a network providing for the transport, storage and processing of information to support management of telecommunication networks and services and is an organized architecture capable of achieving interconnections between various types of Operations System and/or telecommunications equipment. As described in the M.3000 series of recommendations from the Telecommunications Standardization Sector of the ITU (ITU-TS, formerly CCITT), and, in particular, recommendation M.3010 entitled "Principles for a Telecommunications Management Network," CCITT Com IV-R 28, Sect. 11.1, November 1991, incorporated by reference as if fully set forth herein, TMN is said to be "the general architectural requirements . . . to support the management requirements . . . to plan, provision, install, maintain, operate and administer telecommunications networks and services".

Pursuant to ITU-T (X.700), one broad TMN function is Configuration Management which, provides for the control over the configuration of the telecommunications network components and particularly, 1) the provisioning of circuits and paths, managing restoration of circuit and paths, 2) the monitoring end-to-end performance, 3) the locating of faults and, 4) the maintenance of network elements connectivity. Configuration management provides hardware and software necessary to, inter alia, collect and disseminate data concerning the current state of telecommunication network resources, set and modify parameters related to network components, initialize and close down resources, and change the configuration.

One Configuration Management function implies the rearranging of current network bandwidth configuration to enhance network adaptability to both expected and unexpected traffic variations. In TMN, execution of bandwidth management may involve, e.g., rearranging VP bandwidth when a reconfiguration control parameter, such as, e.g., VP use, or when network traffic exceeds a predefined threshold.

Figure 1:
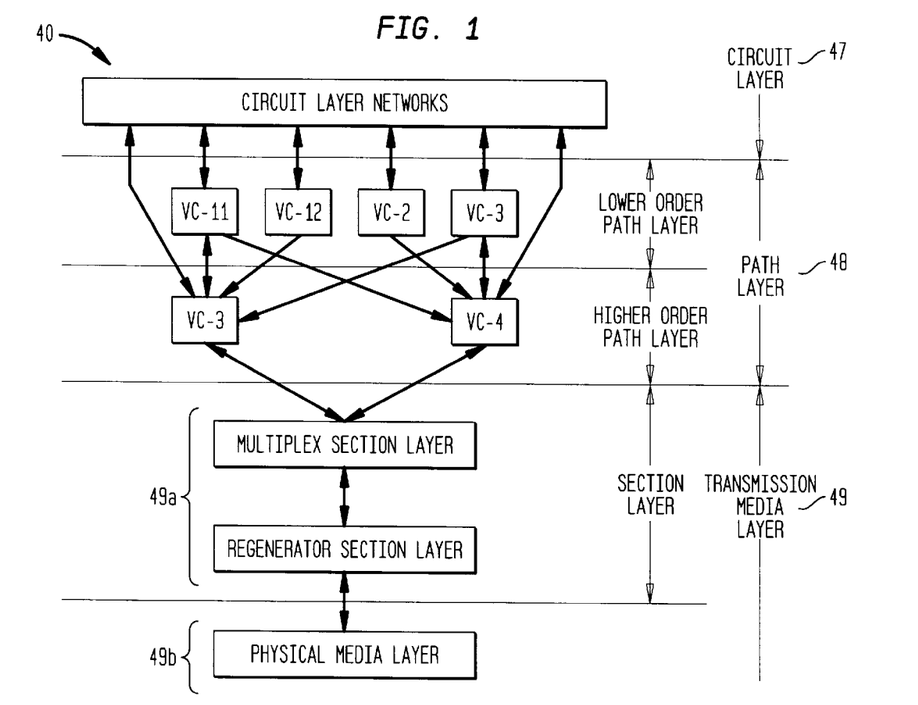
FIG. 1 is a general diagram illustrating an SDH (SONET)-based transport network layered model.

Pursuant to TMN requirements, the SDH and SONET (Synchronous Optical NETwork) transmission schemes have been standardized to provide a layered transport network architecture. For purposes of description, a layer is defined as a set of points of the same kind that can be interconnected due to the very same nature of the signal carried. As shown in FIG. 1, for SDH (SONET), the functional architecture 40 is composed of three layers: the circuit layer 47, path layer 48, and transmission media layer 49 [ITU-T G. 805, 1992]. The circuit layer networks 47 provide telecommunication services such as circuit-switched, packet-switched, and leased-line service and is the end-to-end connection established/released either dynamically or by short-term provisioning. The transmission media network 49 is the layer that interconnects nodes and is the physical connection based on long-term provisioning. This layer may be divided into section layer networks 49a, which provide for the transfer of information between two nodes in path layer networks; and physical media layer networks 49b, which deal with the details of the transmission media. The path layer 48 networks support different types of circuit layers and bridges the circuit 47 and transmission 49 layers by providing logical connections between terminated node pairs. Each of these layers can be designed, activated, and altered independently from other layers. An important characteristic of the SDH (SONET) transmission systems is the capability of providing automated cross-connect functions at each multiplexing level.

The recent trends in ATM(SDH (SONET) broadband technology have led to high-speed fiber transport links, high-capacity network systems, and multimedia services, which trends have increased the importance of the efficient utilization of bandwidth with guaranteed Quality of Service (QoS). Unfortunately, these trends have also increased the vulnerability to network failures.

In the present state of development, most of the bandwidth management schemes deal with either SDH (SONET)/PDH networks alone, such as described for instance in "Dynamic Network Configuration Management" ICC '90, Vol. 2, pp.302.2.1–7 to G. Gopa, et al., or ATM networks, such as described in "Topology Design and Bandwidth Allocation in ATM Networks," *IEEE JSAC,SAC*-7(8), pp. 1253–1262 (1989) to M. Gerla, et al. These schemes propose either the integration of a single technology, e.g., a pure STM (Synchronous Transfer Mode) option or, eventually, a pure ATM option, in an integrated ATM and SDH (SONET) transport network. For instance, in an embedded ATM transport option shown in FIG. 2(a), the ATM cells are completely transparent to the SDH (SONET) network elements (NEs) with ATM cells being mapped to the concatenated mode of SDH (SONET) payloads by using conventional SDH (SONET) Network Elements 38a (NE). The SDH (SONET) NEs provide transport of both STM traffic 41 and additionally, the transport of ATM cells 51 from the customer ATM CPE (customer premises equipment) to the ATM switch and back to the customer ATM CPE. As shown in the network element view of FIG. 2(a), STM switch fabric 30 is used to cross-connect VC3 paths under STM management only, as indicated by element 35.

Figures 2A, 2B:
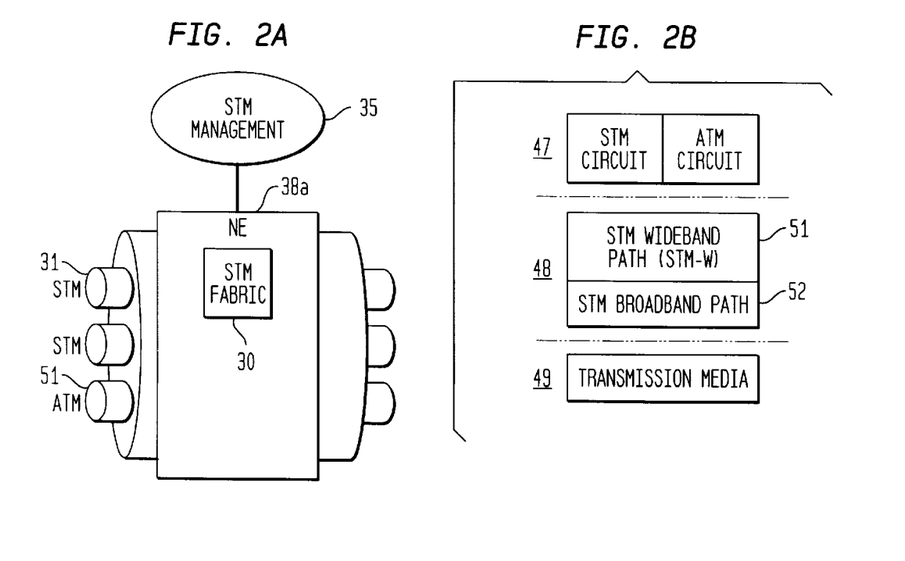
FIG. 2(a) illustrates an embedded ATM transport scheme for accommodating low ATM traffic demand.
FIG. 2(b) illustrates the SDH (SONET) transport network model for an embedded ATM transport scheme.

Utilizing the TMN SDH (SONET) model for layered transport, FIG. 2(b) shows how ATM service may be provided in the SDH (SONET) path layer 48. Particularly, the SDH (SONET) path layer is divided into two different paths layers: STM wideband 51 and STM broadband 52 that have been constructed in the existing SDH (SONET) networks by using SDH (SONET) cross connect systems or Add/Drop Multiplexers ("ADM") to provide transparent transport of ATM traffic. Switching of ATM traffic is performed by ATM edge switches located in the access or CPE network and ATM hub switching systems in the junction or interoffice network (not shown). An ATM Service Access Multiplexer (SAM) can be used at the edge of the public ATM network to provide ATM interfaces and adaptations for customer services to help reduce the transport inefficiencies associated with the conventional SDH (SONET) hierarchical tributary structures.

When there is very little ATM circuit traffic, the implementation of STM wideband path and STM cross connects is sufficient. As ATM traffic demand increases, however, there is a need to provide ATM path. It has been proposed in the reference to Tomonori Aoyama, Ikuo Tokizawa, and Ken-ichi Sato entitled "Introduction Strategy and Technologies for ATM VP-based Broadband Networks" *I.E.E.E. J:S.A.C.*, Vol. 10, No. 9, pp. 1434–1447 (1992), that a pure ATM option will be the preferred network transport option for transporting both STM and ATM traffic.

It would be desirable to enhance network reconfiguration capability by providing network element capability to support three different paths STM broadband, STM wideband, and ATM VP, especially, with the perspective of guaranteeing QoS and favorable economics. Thus, it is important to examine both circuit and path layers in network evolution scenarios to minimize the cost and QoS degradation associated with the circuit emulation between STM and ATM networks.

There have been very few studies that address overall strategy of bandwidth management to utilize the strengths of both ATM and STM technology, and there currently exists the need for service providers to provide flexible, evolvable and cost-effective bandwidth management solutions.

It would be highly desirable to provide a layered bandwidth management system that facilitates network system and service evolution for emerging ATM transport technology and to develop a cost-effective evolution planning strategy.

Additionally, it would be desirable to provide a bandwidth management scheme that exploits the strengths of both STM and ATM technology to realize a more manageable and cost-effective network.

SUMMARY OF THE INVENTION

The instant invention is a scheme implementing ATM VP in the evolving transport network. To do this, it is proposed to divide the transport network level into two layers—the STM path layer and the ATM VP layer—to introduce the layered bandwidth management into the evolving transport network. Sufficient transport bandwidth should be allocated for each level to bound the amount of blocking occurring at the next level. The layered bandwidth management is supported with either a STM cross-connection device and ATM cross-connection device as two separate network elements, or via a hybrid STM/ATM cross-connection that provides a smooth path in the evolution toward ATM in the transport network.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE INVENTION

Figure 3:
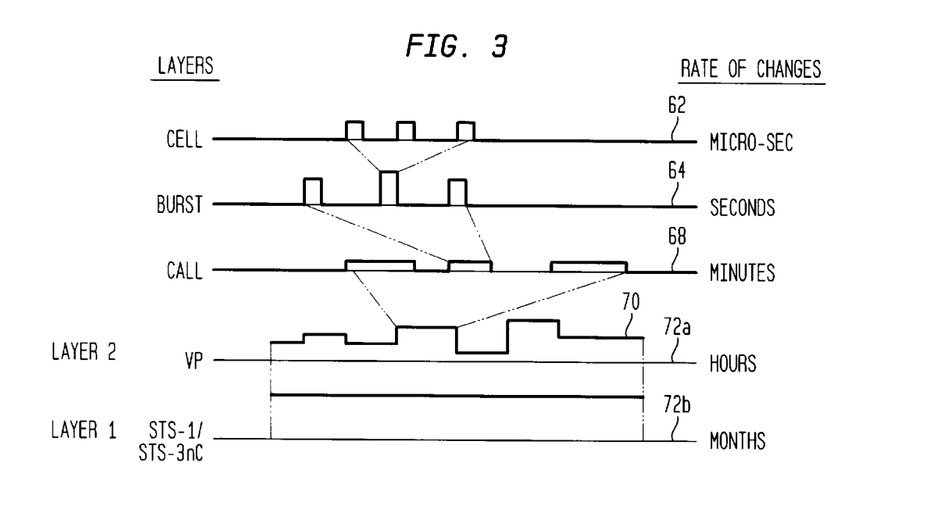
FIG. 3 is a general diagram illustrating a time scale for bandwidth allocation rates of changes.
Figure 4:
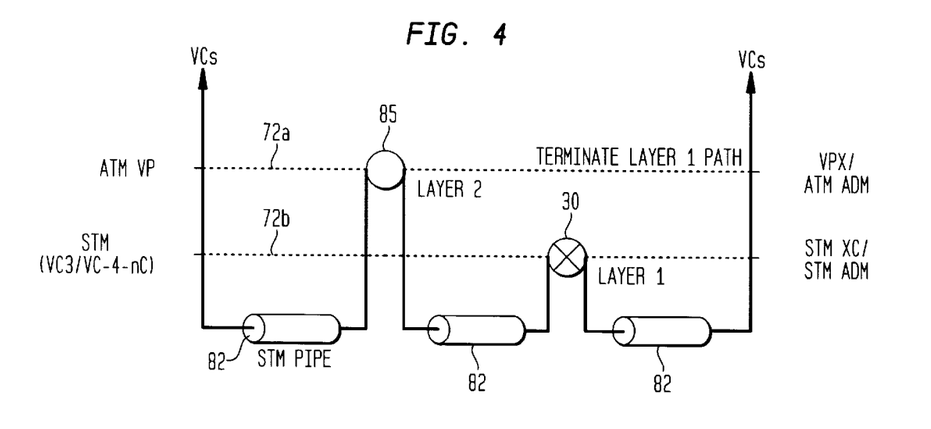
FIG. 4 is a general diagram illustrating layered bandwidth management scheme showing VPX (virtual path cross-connects) and STM path cross-connects.

FIG. 3 illustrates layered bandwidth allocation and rates in which bandwidth allocations change, e.g., at cell level 62, burst level 64, call level 68 and network level 70. Planning of bandwidth allocation for long term traffic variations are performed at the network level 70. In addition to the embedded ATM transport option discussed above, the layered bandwidth management system of the invention provides for the addition of a "hybrid" transport option which, as shown in FIG. 4, includes dividing bandwidth allocation at the network level 70 into two layers, an ATM VP layer 72a for executing ATM path layer management ("Layer 2 Management") for the short term traffic variations and an STM path layer 72b for executing STM path layer management ("Layer 1 Management") for long term service growth. The layered bandwidth management system of the invention is conceptually shown in FIGS. 5(a) which illustrates a hybrid ATM transport scheme for accommodating both ATM and STM traffic and FIG. 5(b) which illustrates the SDH (SONET) transport network model for the hybrid ATM transport scheme. Additionally, as will be described with reference to FIGS. 6(a) and 6(b) a network will provide for the addition of a pure ATM transport option.

The division of the network level into layers 72a,b to form the hybrid transport option facilitates layered bandwidth management and increases capacity efficiency in ATM/SDH (SONET) networks. Particularly, as shown in FIG. 4, capacity efficiency is achieved by providing both ATM Virtual Path ("VP") cross connects 85 and STM cross connects 30 connected to STM pipes, e.g., VC-3 and VC-4 pipes 82 since the provision of only layer 1 path management, i.e., STM cross connect system, leads to inefficient bandwidth utilization due to the inflexibility of STM cross connects and their hierarchical structure of the STM tributaries. This inflexibility issue associated with the boundary of VC-3 tributaries is resolved by the provision of ATM VP cross-connect system for layer 2 management.

Figure 5A:
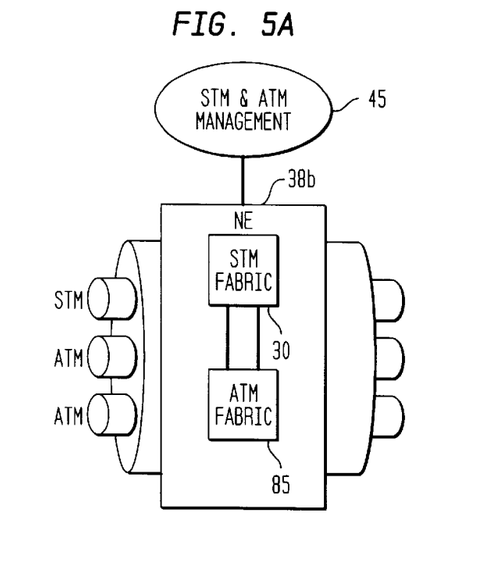
FIG. 5(a) illustrates a hybrid ATM transport scheme for accommodating both ATM and STM traffic.
Figure 5B:
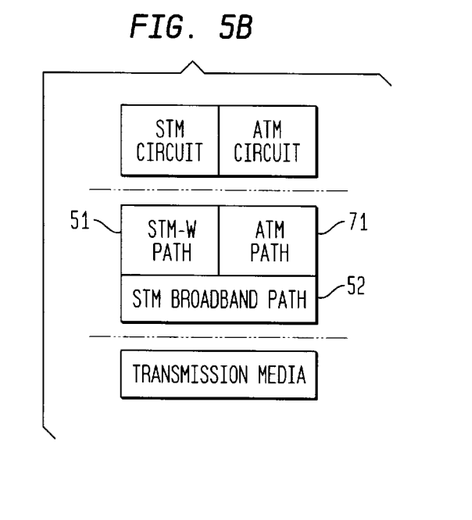
FIG. 5(b) illustrates the SDH (SONET) transport network model for a hybrid ATM transport scheme.

Thus, in the hybrid transport option as shown in FIG. 5(a), both STM and ATM traffic are combined onto the same SDH (SONET) pipe over STM tributaries. The NEs 38b have visibility of the ATM cells. The ATM cross-connect fabric 85 in the hybrid NE is used to aggregate ATM traffic to achieve better fills of the concatenated mode of VC3 tributaries carrying ATM cells. The VC-3 paths containing ATM traffic are dropped at the ATM fabric while VC3 fabric 30 provides VC3 cross-connects. Therefore, this NE 38b requires both STM and ATM management as indicated by element 45.

Service providers may want to add ATM functionality to the SDH (SONET) NEs for the improvement of network bandwidth and flexible introduction of new services with the inherent benefits of ATM technologies. As show in the SDH (SONET)-based transport network layered model of FIG. 5(b), the path layer is divided into three different paths: STM wideband, STM broadband, and ATM VP. As explained above, the STM wideband and broadband layers have already been constructed in existing SDH (SONET) networks. The VP extends the concept of path layers to ATM networks. Performance of ATM layer grooming at the ATM path 71 helps to reduce the number of expensive ATM switching systems while STM wideband path 51 applications continue to be important for growing E1/T1 services. To utilize the inherent strength of the ATM VP technology, E1/T1 services can be circuit emulated by converting the E1/T1 traffic to ATM at the edge, connecting the converted ATM traffic through the network, and converting back to E1/T1 traffic circuits on the other side. There is a potential to reduce the overall network equipment cost because ATM connections may be less expensive than STM wideband connections of the same rate, since there does not need to be tributary processing in different paths.

As shown in FIG. 4, at the ATM VP layer 72a, the route and bandwidth of VPs are defined independently with the route being provisioned in the database of the VP terminators and cross-connects and, the bandwidth reconfiguration of the VP achieved simply by changing database values in the VP terminators and cross-connects. This inherent benefit provides more dynamic bandwidth reconfiguration. Particularly, characteristics of Layer 2 bandwidth management utilizing VPs in ATM layer paths enables: 1) ATM path traversing ATM VP Cross-Connects (VPXs); 2) bandwidth management for bundle of ATM VCs; 3) reduction of the number of intermediate ATM switch hops along the path; 4) flexible bandwidth allocation; and, 5) efficient bandwidth utilization for service growth and network restoration. Similarly, for Layer 1 bandwidth management utilizing STM layer paths VC-3/VC-4-nC there is provided: 1) STM path traversing ADM/STM cross-connects; 2) bandwidth management for bundle of VPs; 3) reduction in the number of intermediate ATM hops along the path; 4) reduction of buffering delay and nodal processing overhead; and 5) reduction in the number of SDH (SONET) path terminations.

In SDH (SONET) networks, a digital path is established by assigning a time slot for the TDM frame at each cross-connect on the path. Thus, path route establishment and bandwidth assignment are interdependent. Fixed bandwidth digital paths can be established hierarchically. STM cross connect systems are very cost-effective with non-blocking operation. Thus, the use of the STM path management between network nodes eliminates the problem of processing cells at gigabit-per-second rates in the high speed backbone network.

The concatenated mode of SDH (SONET) tributaries such as VC-4-nC provides a container for ATM traffic. For some applications in ATM networks where the bandwidth reallocation unit for traffic demand is VC3/VC-4-nC, switching entire VC3/VC-4-nC ATM containers is more desirable then switching individual ATM cells. The high-speed transport network with multiple ring interconnections is an example in the ATM/STM hybrid network. The interconnected ring networks can be dynamically reconfigured by adding or dropping the entire VC3/VC-4-nC tributaries. SDH (SONET) will be terminated only when grooming at the ATM layer is needed.

Figure 6A:
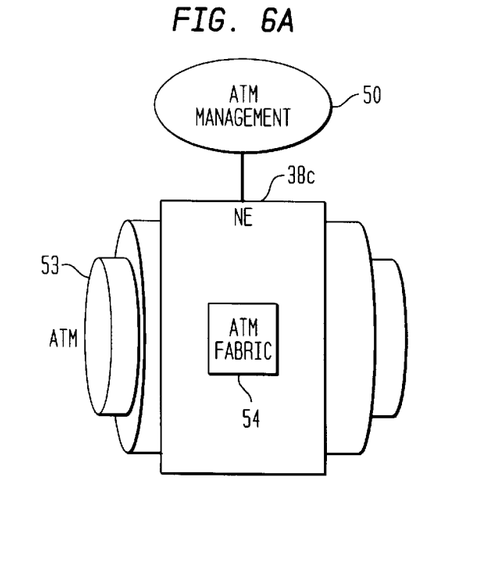
FIG. 6(a) illustrates a pure ATM transport scheme for accommodating ATM traffic.

The inevitability of a pure ATM transport option is shown and now described with reference to FIG. 6(a). As shown in FIG. 6(a), the NE 38 carries all ATM and STM traffic as ATM cells in a single SDH (SONET) tributary. STM traffic is circuit emulated (if necessary) into ATM cells to maximize the bandwidth utilization of a given SDH (SONET) pipe by using ATM technologies. The single tributary VC4 indicated as element 53 in the STM-1 pipe is utilized for ATM traffic under ATM management only as indicated as element 50. Switching of ATM traffic will be provided by the ATM Fabric 85. This pure ATM scheme having only ATM cross-connect may be deficient in the respect that pure STM traffic has to be terminated at every node which may introduce greater delay and processing overhead.

Figure 6B:
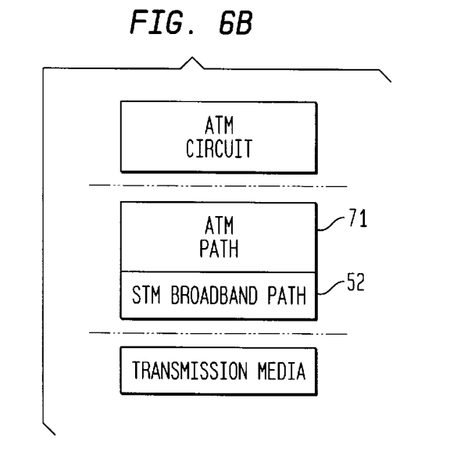
FIG. 6(b) illustrates the SDH (SONET) transport network model for a pure ATM transport scheme.

As shown in FIG. 6(b), as ATM traffic demands increase, the transport option in the transport access network will be changed to pure ATM transport with a single SDH (SONET) tributary such as STM-1 and STM-4c, as indicated as element 53. The ATM traffic in the single SDH (SONET) tributary will be terminated at the junction network for grooming at the ATM layer. STM broadband path 52 applications still play an important role as a container for the ATM traffic.

Figure 7A:
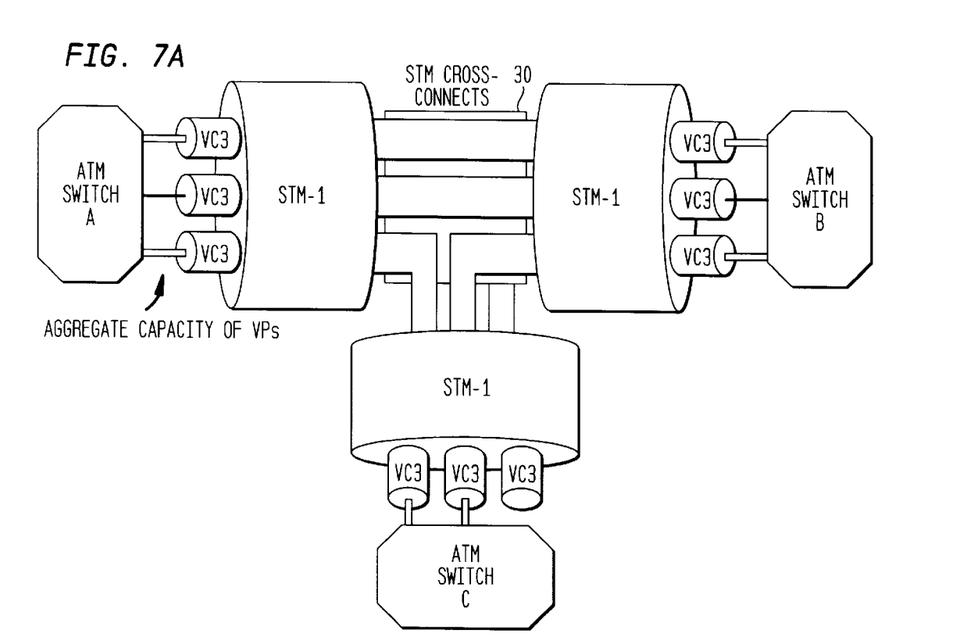
FIGS. 7(a)–7(c) illustrate example network configurations showing the benefit of layered bandwidth management.

To illustrate the operations of each layer management, a non-limiting example network model having three ATM Switch (ATM-SW) nodes, is now considered. As illustrated in FIG. 7(a), an STM cross-connect system 30 interconnects the three ATM Switch (ATM-SW) nodes labeled ATM-SW A,B and C for the bandwidth management with, e.g., STM-1 physical links provided between the STM cross-connect system 30 and ATM-SWs. In the example, the model network accommodates two types of services, e.g., class 1 and class 2 service with no spare capacity being reserved for the network protection. In the example, the class 1 is a video service that is coded at 10 Mb/s with the transport being rate-controlled at 10 Mb/s and the class 2 traffic is 10 Mb/s native LAN traffic. Each service class is assigned to different VPs for the segregation of different QoS requirements. The network management system is located at an administrative center that communicates with the ATM-SWs to collect the data of existing demands, from which the required bandwidth for the forecast demands is calculated as described for instance in the reference entitled "Medium-Term Centralized Virtual-Path Bandwidth Control Based on Traffic Measurements," *IEEE Transactions on Communications*, Vol. 43, No. 10, October 1995 to M. Logothetis, Michael and S. Shioda, the contents and disclosure of which are incorporated by reference as if fully set forth herein.

FIG. 7(a) a shows an initial configuration of this model that provides the capability of the layer 1 management. Customer AB transports three class 1 and three class 2 services between the switch pair A and B and customer AC and BC transport two class 1 and two class 2 services between the switch pair A and C, B and C, respectively. Thus customer AB requires two VC3s. Surplus bandwidth on each VC3 is about 8 Mb/s and 28 Mb/s respectively, since a VC3 provides a customer an available bit rate of 48 Mb/s. The customers BC and AC would require a VC3 with 8 Mb/s surplus bandwidth.

Figure 7B:
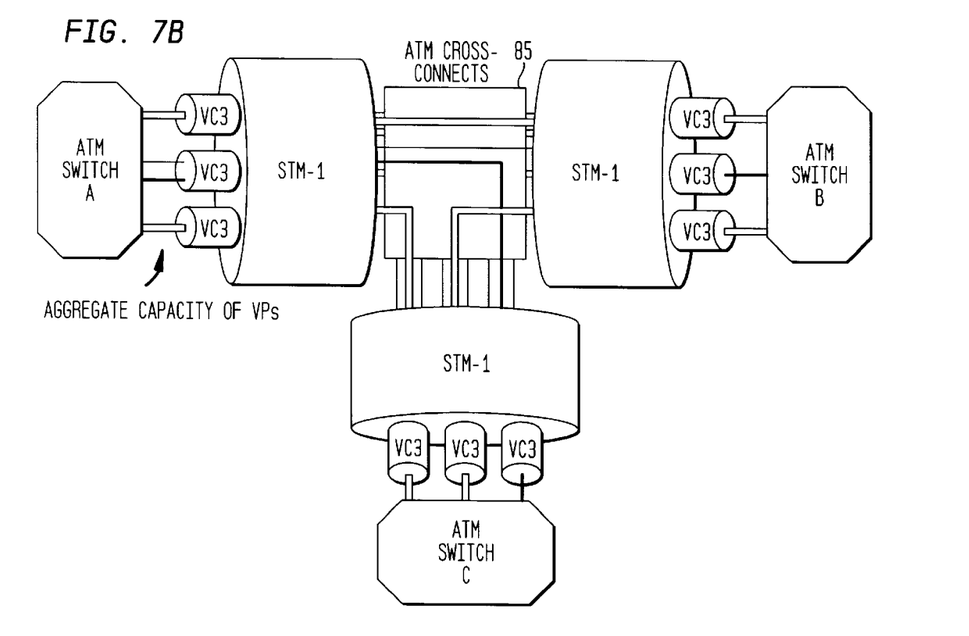

When the forecast traffic demands change, e.g., as customer AB stops subscribing to a class 1 service and the customer AC wishes to transport two more class 2 services, customer AC can not simply use the surplus bandwidth on a VC3 between the ATM-SW A and the STM cross-connect system that handles VC3 cross-connects due to the boundary of the VC3 tributaries. This clearly leads to inefficient bandwidth utilization. As shown in FIG. 7(b), by replacing the STM cross-connect system with an ATM VP cross-connect system 85, the inflexibility issue associated with the boundary of the VC3 tributaries is resolved as customer AB and AC can now share the same VC3 to transport their ATM traffic.

Figure 7C:
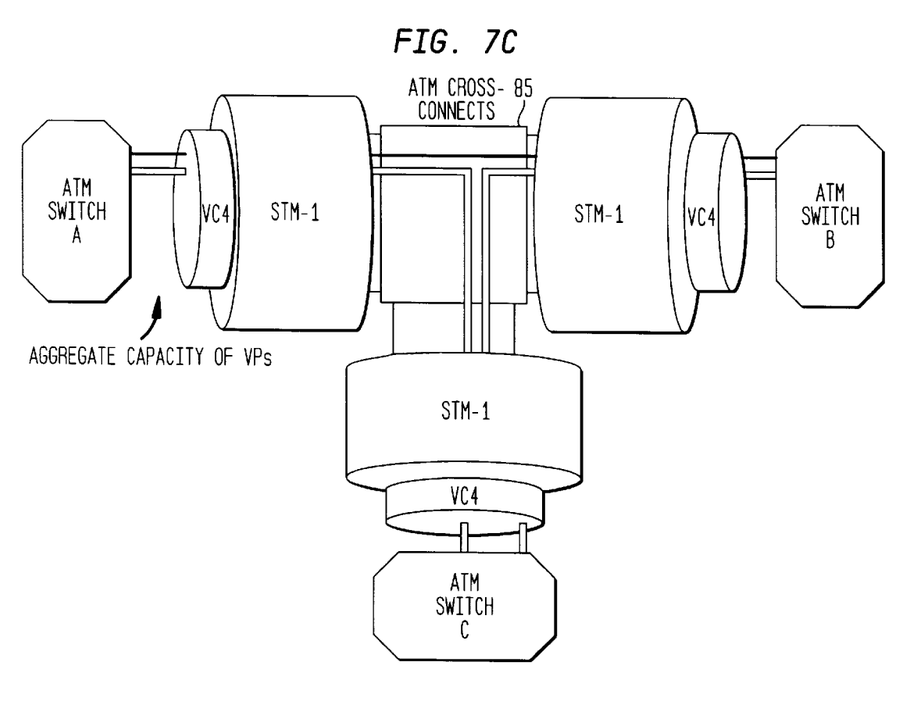

As ATM traffic demands increase, the transport option in the transport access network will be changed to pure ATM transport with a single SDH (SONET) path. FIG. 7(c) shows that bandwidth utilization can be maximized by using a single tributary, e.g., VC4, with no barrier to surplus capacity.

Figure 8:
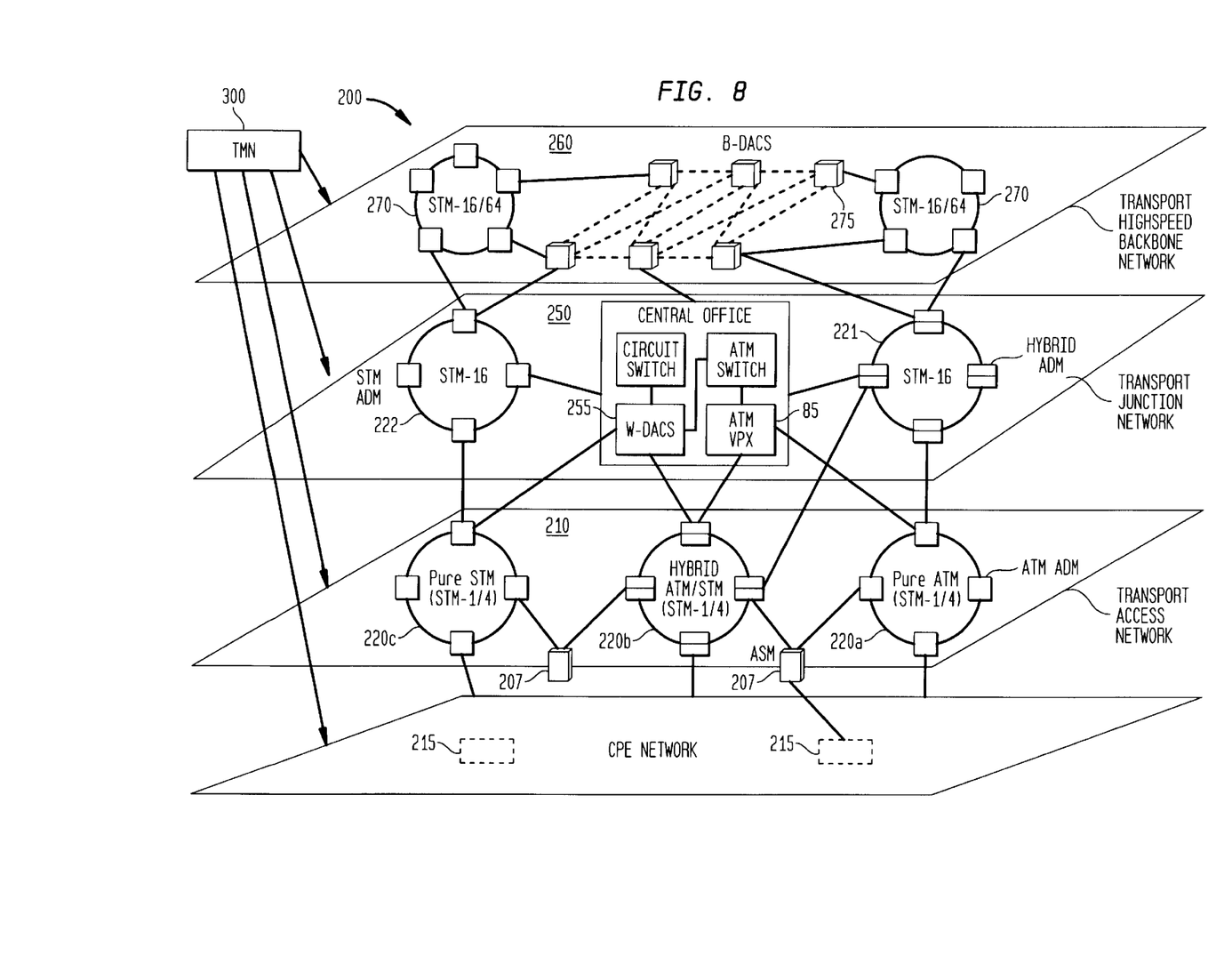
FIG. 8 illustrates a conceptual diagram of Layered Bandwidth Management at the Transport Network.

FIG. 8 illustrates conceptually the ATM/SDH (SONET) transport network 200 and the use of layered bandwidth management system in the transport network. The ATM transport network 200 is theoretically divided into the transport access network 210, the transport junction network 250, and the transport high-speed backbone network 260. The Telecommunications Management Network 300 integrates all operation, administration and maintenance functions for these network components.

The transport access network 210 collects traffic from a set of end-user CPE (customer premises equipment) network elements 215, such as, e.g., telephones, local area networks, PBX's etc., and ATM service multiplexers 207 are provided to multiplex traffic to one or more designated nodes in the network 200. The SDH (SONET)/ATM ring 220a containing pure ATM transport nodes is provided in the access network for accommodating high ATM demand, ATM/STM hybrid ring 220b containing hybrid ATM transport nodes is provided in the access network for accommodating low ATM demand, and STM ring 220c containing nodes for accommodating STM and transparent ATM cell traffic are also provided in the access network. Each of the layers 220a,b,c connect businesses to the network and can be used for residential access as well. For ATM services the transport access network 210 provides dynamic bandwidth management by using SAM and/or ATM edge switches to best utilize the bandwidth.

The junction transport network 250 provides grooming, consolidation, and segregation of different facilities and services in the transmission network between switching systems and between carrier terminals. Grooming is a function that allows both incoming and outgoing facilities by the cross-connections of tributaries and various types of DACSs can be implemented for these network requirements. The importance of this grooming function continues to increase as networks evolve to ATM. FIG. 8 shows an ATM VP cross-connect mesh network 85 provided for the layer 2 management and wideband DACS (W-DACS) 255 for the STM wideband service grooming. The role of W-DACS continues to be important for the growing E1/T1 services as described herein. The ATM/STM hybrid rings 221 and STM ADMs 222 can be effectively utilized to accommodate the transport access network in the high-speed optical transmission lines.

The transport backbone network 260 uses very high capacity fibers that are administered at the broadband granularity for Layer 1 management. STM based high speed STM-16/64 rings 270 and broadband SDH (SONET) cross-connects (B-DACS) 275 are used in this network to provide STM express pipes that are filled by the Layer 2 management at the access and junction networks.

The foregoing merely illustrates the principles of the present invention. Those skilled in the art will be able to devise various modifications, which although not explicitly described or shown herein, embody the principles of the invention and are thus within its spirit and scope.

What is claimed is:

1. A layered bandwidth management system for transporting both STM and ATM traffic from customer circuit elements over a synchronous digital hierarchical SDH (SONET) transport network comprising:

hybrid transport means for separately transporting STM and ATM traffic over separate first physical channels, said physical channels having a fixed bandwidth allocation;

first bandwidth control means responsive to said STM traffic contained in said first physical channels for directing STM traffic in fixed bandwidth allocations; and, second bandwidth control means responsive to ATM traffic contained in said separate first physical channels for switching said ATM traffic, said second bandwidth control means capable of directing ATM traffic to said first physical channels for more efficient physical channel bandwidth utilization.

2. A layered bandwidth management system as claimed in claim 1, further comprising first ATM transport means for transporting STM traffic having embedded ATM cells mapped to STM traffic payloads over said first physical channels.

3. A layered bandwidth management system as claimed in claim 2, wherein said first physical channels includes a VC3 synchronous digital hierarchy tributary, said VC3 capable of transporting an aggregate capacity of ATM virtual paths.

4. A layered bandwidth management system as claimed in claim 1, further comprising second ATM transport means for transporting ATM cells over second physical channels.

5. A layered bandwidth management system as claimed in claim 4, further comprising means for converting STM traffic to ATM cells for transport over said second ATM transport means.

6. A layered bandwidth management system as claimed in claim 4, wherein said second ATM transport means includes VC4 synchronous digital hierarchy tributary.

7. A layered bandwidth management system as claimed in claim 1, further including means for collecting said STM and ATM traffic from said customer circuit elements and multiplexing said traffic to a transport access network.

8. A layered bandwidth management system as claimed in claim 7, wherein said collecting means includes ATM service multiplexer for multiplexing ATM traffic to said transport access network.

9. A layered bandwidth management system as claimed in claim 4, wherein said second first bandwidth control means is responsive to said ATM traffic contained in said second ATM transport means.

10. A layered bandwidth management system as claimed in claim 1, wherein said second bandwidth control means includes an ATM virtual path cross-connect system located in a central office.

11. A layered bandwidth management system as claimed in claim 1, wherein said first bandwidth control means includes wideband cross-connect system located in a central office.

12. A layered bandwidth management system for transporting both STM and ATM traffic from customer circuit elements over a transport network, and for accommodating increasing ATM traffic demand over time, said bandwidth management system comprising:

first ATM transport means for transporting STM traffic having embedded ATM cells mapped to STM traffic payloads over first physical channels, said physical channels having a fixed bandwidth allocation;

hybrid transport means for separately transporting STM and ATM traffic over separate first physical channels;

second ATM transport means for transporting ATM cells over second physical channels;

first bandwidth control means responsive to said STM traffic contained in said first physical channels for directing STM traffic in fixed bandwidth allocations; and, second bandwidth control means responsive to ATM traffic contained in said separate first physical channels for switching said ATM traffic, said second bandwidth control means capable of directing ATM traffic to said first physical channels for more efficient physical channel bandwidth utilization.

13. A layered bandwidth management system for transporting both STM and ATM traffic as claimed in claim 12 wherein short term ATM traffic variations are accommodated by said second bandwidth control means and long term STM traffic variations are accommodated by said first bandwidth control means.

* * * * *